United States Patent
Rausch et al.

(10) Patent No.: US 10,026,420 B1
(45) Date of Patent: *Jul. 17, 2018

(54) DATA STORAGE DEVICE WITH COLD DATA MIGRATION

(71) Applicant: Seagate Technology LLC, Cupertino, CA (US)

(72) Inventors: Tim Rausch, Farmington, MN (US); Jon D. Trantham, Chanhassen, MN (US); John W. Dykes, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/950,741

(22) Filed: Nov. 24, 2015

Related U.S. Application Data

(60) Provisional application No. 62/083,782, filed on Nov. 24, 2014.

(51) Int. Cl.

| | |
|---|---|
| *G11B 11/00* | (2006.01) |
| *G11B 5/012* | (2006.01) |
| *G11B 5/09* | (2006.01) |
| *G11B 5/455* | (2006.01) |
| *G11B 5/00* | (2006.01) |
| *G11B 5/31* | (2006.01) |
| *G11B 27/36* | (2006.01) |

(52) U.S. Cl.
CPC ................. *G11B 5/012* (2013.01); *G11B 5/09* (2013.01); *G11B 5/455* (2013.01); *G11B 5/314* (2013.01); *G11B 27/36* (2013.01); *G11B 2005/0021* (2013.01); *G11B 2220/20* (2013.01)

(58) Field of Classification Search
None
See application file for complete search history.

(56) References Cited

U.S. PATENT DOCUMENTS

| | | | | |
|---|---|---|---|---|
| 6,137,644 | A * | 10/2000 | Hetzler | G11B 20/1258 360/48 |
| 6,249,890 | B1 * | 6/2001 | Ukani | G06F 11/008 360/53 |
| 6,405,277 | B1 | 6/2002 | Jen et al. | |
| 6,940,679 | B1 | 9/2005 | McNeil et al. | |
| 7,304,816 | B2 * | 12/2007 | Johnson | G11B 19/04 360/31 |
| 7,369,339 | B2 * | 5/2008 | Kojima | G11B 19/04 360/31 |
| 7,543,178 | B2 * | 6/2009 | McNeill | G06F 11/008 714/6.21 |
| 8,140,914 | B2 | 3/2012 | Murphy et al. | |
| 8,407,516 | B2 | 3/2013 | Swanson et al. | |
| 8,760,780 | B1 * | 6/2014 | Brooker | G11B 27/36 360/31 |

(Continued)

*Primary Examiner* — Tan X Dinh
(74) *Attorney, Agent, or Firm* — Hall Estill Attorneys at Law

(57) ABSTRACT

In a data storage device where a data writer is predicted to fail, cold data can be identified and subsequently moved to a data storage medium corresponding to the failing data writer. The data writer may be positioned proximal the data storage medium where data is stored. A controller can predict the failure in the data writer and transition all the data in the data storage medium to a read only status.

20 Claims, 2 Drawing Sheets

(56) References Cited

U.S. PATENT DOCUMENTS

| | | | |
|---|---|---|---|
| 8,854,929 B1 * | 10/2014 | Champion | G11B 20/10305 |
| | | | 369/13.13 |
| 8,953,266 B2 | 2/2015 | Dhanda et al. | |
| 8,984,161 B2 | 3/2015 | Nagpal et al. | |
| 9,037,921 B1 | 5/2015 | Brooker et al. | |
| 9,141,457 B1 | 9/2015 | Ma et al. | |
| 9,189,309 B1 | 11/2015 | Ma et al. | |
| 9,218,849 B1 * | 12/2015 | Trantham | G11B 27/36 |
| 9,390,761 B2 * | 7/2016 | Trantham | G11B 27/36 |
| 2007/0079170 A1 | 4/2007 | Zimmer et al. | |
| 2015/0074367 A1 | 3/2015 | Cher et al. | |
| 2016/0148652 A1 * | 5/2016 | Trantham | G11B 27/36 |
| | | | 369/13.02 |

* cited by examiner

DATA STORAGE DEVICE WITH COLD DATA MIGRATION

RELATED APPLICATION

The present application makes a claim of domestic priority to U.S. Provisional Patent Application No. 62/083,782 filed Nov. 24, 2014, the contents of which are hereby incorporated by reference.

SUMMARY

A data storage device, in accordance with various embodiments, has a controller connected to a data writer and a data storage medium. The controller predicts a failure in the data writer and subsequently moves cold data to the data storage medium. The cold data is then assigned a read only status allowing a functioning data reader to operate despite a failing or failed data writer.

DETAILED DESCRIPTION

Heat assisted magnetic recording (HAMR) technology appears to address issues associated with storing increasing volumes of data generation. HAMR technology can be implemented into rotating data storage devices while maintaining small form factors that are conducive to increasingly mobile computing devices. However, it is possible that one or more HAMR components in a data storage device can fail over the life of the device, which renders the device incapable of programming data to at least a portion of the device.

With these issues in mind, a data storage device may be arranged with a data writer connected to a controller and separated from a plurality of data bits stored in a data storage medium with the controller configured to move cold data to the data storage medium in response to a predicted failure in the data writer. The migration of cold data to a data surface corresponding to a failing data writer allows the data surface to remain a viable aspect of a data storage device despite a failed data writer.

Figure 1:
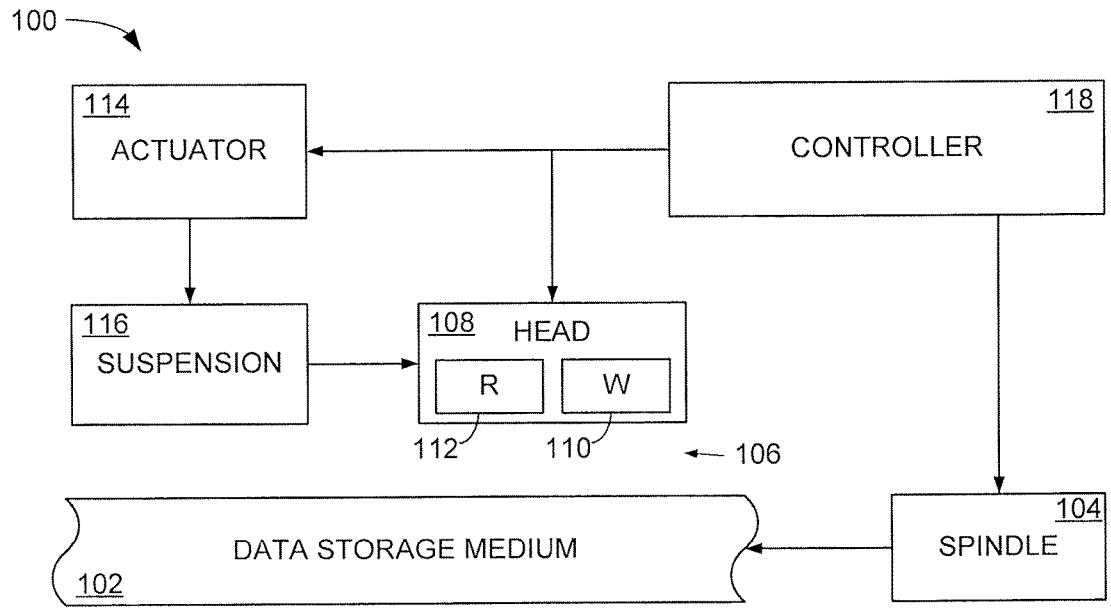
FIG. 1 is a block representation of an example data storage system configured and operated in accordance with some embodiments.

Although not required or limiting, a data writer can employ HAMR technology in the example data storage device 100 shown a block representation in FIG. 1. In the portion of the example data storage device 100 illustrated in FIG. 1, a single data storage medium 102 is connected to a spindle 104 that can operate to create an air bearing 106 on which a transducing head 108 flies to program and sense data bits stored in the data storage medium 102. The transducing head 108 can incorporate any number of computing components, such as a data writer 110 and reader 112, that are attached to an actuator 114 via a suspension 116, such as a gimbal.

It is contemplated that the transducing head 108 consists of other components, like a microactuator, slider, and electrical interconnects, that facilitate movement of the data writer 110 and reader 112 over data bits and data tracks on the data storage medium 102 to read and program data bits individually and collectively. One or more controllers 118 can be locally and remotely connected to the transducing head 108, actuator 114, and spindle 104 to provide data bit access operations to and from predetermined portions of the data storage medium 102.

Minimization of the physical size of the air bearing 106 and transducing head 108 has corresponded with increasing data bit areal density on the data storage medium 102. As such, the time that the data writer 110 or data reader 112 passes over an individual data bit is reduced, which stresses the efficiency of data bit access, particularly data bit programming where magnetic polarity is induced on the data bit from the data writer 110. Configuring the data writer 110 with HAMR technology can alleviate these issues and others.

Figure 2:
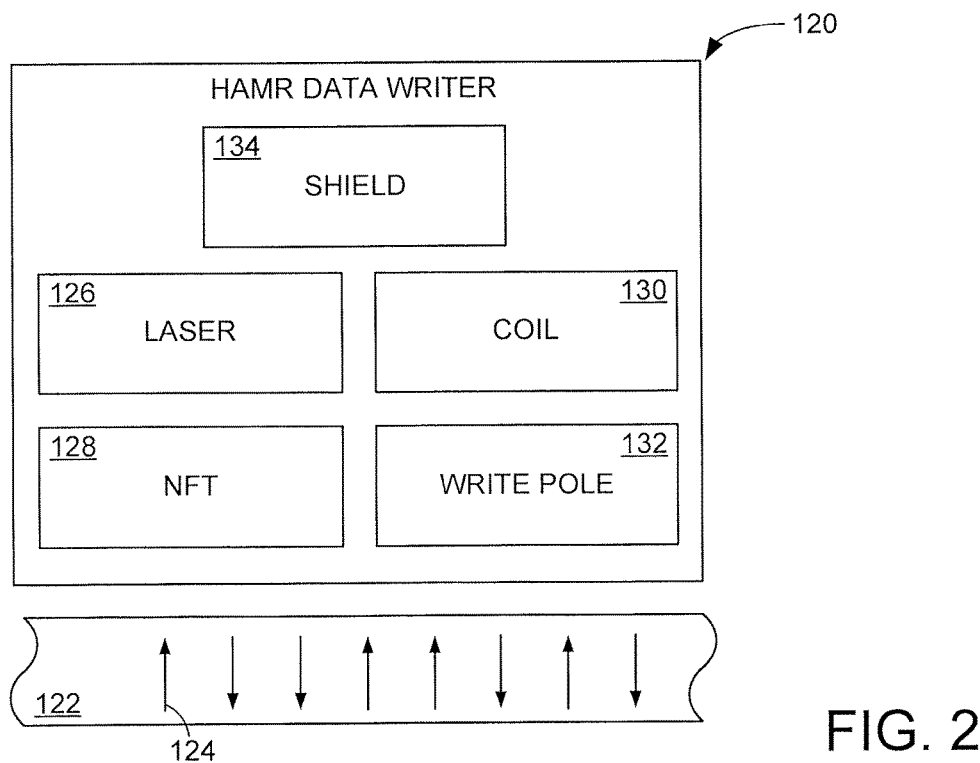
FIG. 2 displays a block representation of a portion of an example data storage device capable of being used in the data storage system of FIG. 1.

FIG. 2 is a block representation of an example HAMR data writer 120 that may be employed in the data storage device 100 of FIG. 1 in accordance with various embodiments. The HAMR data writer 120 can be positioned partially or completely on a suspended portion of a transducing head to temporarily heat portions of the data storage medium 122 to lower the magnetic coercivity of selected data bit(s) 124 and more efficiently allow magnetic flux of a predetermined polarity to be programmed into the selected data bit(s) 124.

The data storage medium 122 may be heated via any number of heat producing means, such as a laser diode 126 that passes a beam of light energy through a near field transducer 128 to bring the data bit(s) 124 past the data storage medium's Curie temperature and allow for efficient passage of magnetic flux from a coil 130 to the data bit 124 through at least one write pole 132. The write pole 132 may have one or more magnetic shields 134 that allow other data access components, such as a data reader, to be positioned proximal the data writer 120 on a transducing head.

It is contemplated that the heating means of the data writer 120, which may be characterized as the laser diode 126 and near field transducer 128, can fail at a greater frequency and shorter lifespan than the data access means of a data reader. It is further contemplated that the heating means often experiences failures predictively and over time. That is, HAMR data writer failures can be predicted by identifying changes in the operating conditions of the HAMR data writer that indicate the heating and/or data access components of the data writer are trending towards failure.

It is contemplated that non-HAMR data writers, such as components without a laser diode 126 and/or near field transducer 128, can fail abruptly, which inhibits the ability to proactively adapt to a failing data writer. However, a HAMR data writer can experience degraded performance and changing writing characteristics over time that allows a controller to identify the data writer is failing and utilize the remaining life of the data writer to transition a data surface to a write once read many configuration. That is, the laser diode 126 and near field transducer 128 can fail predictively and over time to allow infrequently updated data to be moved to the data surface corresponding to the failing data writer.

Figure 3:
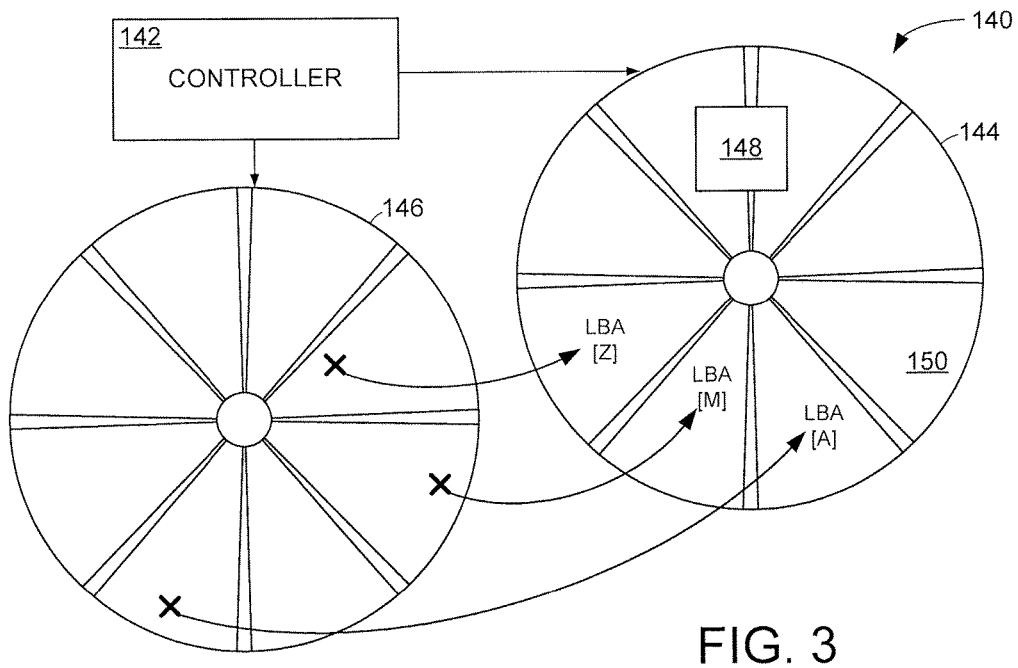
FIG. 3 shows a top view block representation of a portion of an example data storage device configured and operated in accordance with various embodiments.

FIG. 3 is a top view block representation of portions of an example data storage device 140 arranged in accordance with some embodiments. A controller 142 can be connected to at least first 144 and second 146 data storage media that respectively are accessed by different transducing heads 148 to store and retrieve data. The controller 142 can be configured to detect that a transducing head 148, such as a HAMR data writer, is failing.

The prediction of a failing transducing head 148 can provide time for the controller 142 to move cold data from a secondary memory to the data surface 150 corresponding to the failing transducing head 148. In the non-limiting example shown in FIG. 3, the controller 142 can migrate multiple different individual data bits, blocks of data bits, and segments of logical block addresses onto the data surface 150 proximal the failing transducing head 148. It should be noted that cold data can be characterized as data that is updated infrequently. That is, cold data can be identified as data that has been changed less than a predetermined number of times, such as less than once a day, hour, or month.

The migration of such cold data to the data surface 150 of the failing transducing head 148 allows the data reader portion of the transducing head 148 to continue operation despite the inability to write data to the data surface 150. It can be appreciated that moving cold data to the data surface 150 of the failing transducing head 148 frees up other portions of a data storage system for storage of data that is more frequently updated or moved, such as metadata. It is noted that the data surface 150 of the failing transducing head 148 may be characterized as a read only portion of the data storage system due to the inability to write data with the failed transducing head 148.

Figure 4:
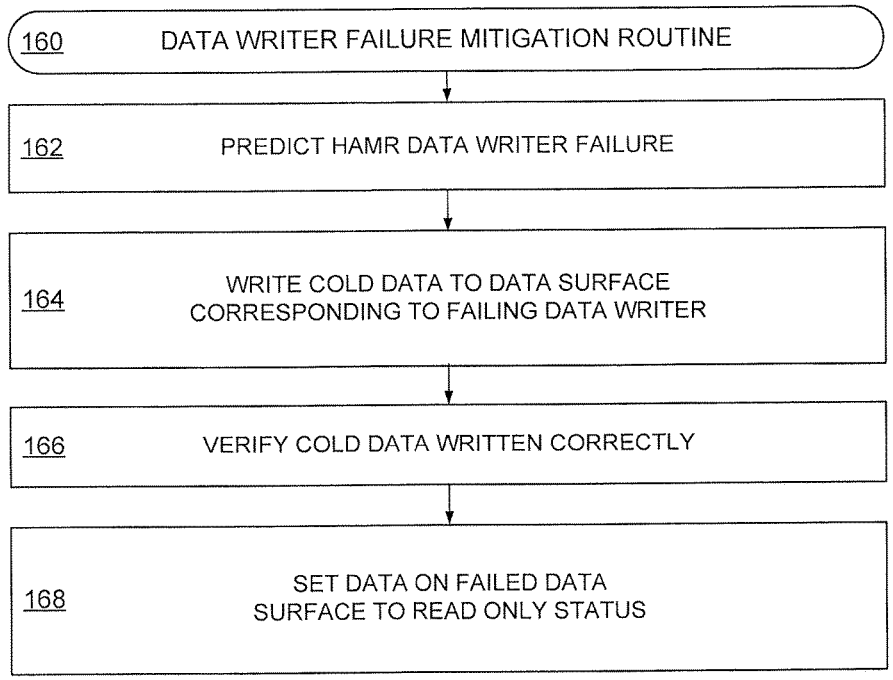
FIG. 4 provides a flowchart of an example cold data migration routine carried out in accordance with assorted embodiments.

FIG. 4 is an example data writer failure mitigation routine 160 that can be conducted in accordance with various embodiments. Initially, step 162 predicts a failure of a data writer, such as a HAMR writer. Such prediction may be calculated from one or more algorithms and may involve comparing current data writer performance, such as bit error rate, with past logged performance. The prediction of step 162 can compute a time interval in which the data writer is expected to fail. Such time interval may further predict how much write accuracy degradation will occur at different times.

Next, step 164 utilizes the remaining life of the failing transducing head to identify cold data from various aspects of the data storage device, such as cache regions, other rotating data storage media, and solid state non-volatile memories, prior to moving cold data from secondary memory to the data surface corresponding with the failing data writer. Although not required or limiting, cold data written in step 164 may be immediately or subsequently verified for accuracy in step 166. With cold data migrated to the failing data surface, or in the event the data writer fails before the cold data has been migrated, step 168 sets the failed data surface as a read only region where any data writing command is returned to a host with an error.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising:
   a data writer separated from data stored in a data storage medium; and
   a controller connected to the data writer and configured to write cold data previously resident in a different data storage location to the data storage medium in response to a predicted failure of the data writer.

2. The apparatus of claim 1, wherein the data writer is separated from the data storage medium by an air bearing during operation.

3. The apparatus of claim 1, wherein the data writer is a heat assisted magnetic recording (HAMR) writer.

4. The apparatus of claim 3, wherein the data writer comprises a laser and near field transducer.

5. A method comprising:
   positioning a data writer proximal a data storage medium where data is stored;
   predicting a failure in the data writer with a controller connected to the data writer; and
   writing cold data previously resident in a different data storage location to the data storage medium in response to the predicted failure.

6. The method of claim 5, wherein the controller deactivates the data writer in response to the predicted failure in the data writer and after the cold data has been moved to the data storage medium.

7. The method of claim 5, wherein the controller identifies cold data prior to the predicted data writer failure.

8. The method of claim 5, wherein the data writer writes the cold data to the data storage medium after the predicted failure.

9. The method of claim 5, wherein the data writer is predicted to fail over a predicted time interval, the cold data moved to the data storage medium in the predicted time interval.

10. The method of claim 5, wherein the cold data is resident in a different data storage medium prior to being moved in response to the predicted data writer failure.

11. The method of claim 5, wherein the controller verifies the writing of the cold data prior to setting the cold data to a read only status.

12. The method of claim 5, wherein a data reader resident on a common transducing head as the data writer remains functional despite the failure of the data writer.

13. The method of claim 5, wherein the predicted data writer failure results in the data writer not being able to write data to the data storage medium.

14. The method of claim 5, wherein the cold data is identified by the controller in response to data being updated less than a predetermined number of times.

15. A method comprising:
   positioning a first data writer proximal a first data storage medium where a first group of data is stored;
   positioning a second data writer proximal a different second data storage medium where a second group of data is stored;
   predicting a failure in the first data writer with a controller connected to the first data writer;
   identifying a portion of the second group of data as cold data; and
   writing the cold data to the first data storage medium in response to the predicted failure.

16. The method of claim 15, wherein the controller moves a portion of the first group of data to the second data storage medium.

17. The method of claim 16, wherein the portion of the first group of data is identified as frequently updated.

18. The method of claim 15, wherein a status of the cold data is changed to read only after being written to the first data storage medium.

19. The method of claim 15, wherein the second data writer operates after the first data writer fails.

20. The method of claim 15, wherein a data reader attached to the first data writer operates to retrieve data from the first data storage medium after the first data writer fails.

* * * * *